United States Patent
Miura et al.

(10) Patent No.: US 7,201,690 B2
(45) Date of Patent: Apr. 10, 2007

(54) DRIVE UNIT FOR VEHICLE

(75) Inventors: Kiyotomo Miura, Anjo (JP); Kenji Omote, Anjo (JP); Satoru Wakuta, Anjo (JP); Kazutoshi Motoike, Toyota (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 10/851,320

(22) Filed: May 24, 2004

(65) Prior Publication Data
US 2005/0014601 A1 Jan. 20, 2005

(30) Foreign Application Priority Data
May 29, 2003 (JP) ............... 2003-153119

(51) Int. Cl.
*F16H 3/72* (2006.01)
(52) U.S. Cl. .............................. 475/2; 475/5
(58) Field of Classification Search ............ 475/1, 475/2, 5; 192/220.2
See application file for complete search history.

(56) References Cited
U.S. PATENT DOCUMENTS

| | | | | |
|---|---|---|---|---|
| 3,623,568 A | * | 11/1971 | Mori | 180/15 |
| 6,081,042 A | * | 6/2000 | Tabata et al. | 290/45 |
| 6,672,981 B2 | * | 1/2004 | Inoue et al. | 474/28 |
| 2003/0064854 A1 | * | 4/2003 | Kotani | 477/3 |

FOREIGN PATENT DOCUMENTS

| | | | | |
|---|---|---|---|---|
| JP | | 5-330352 | * 12/1993 | 475/5 |
| JP | A | 2002-225578 | 8/2002 | |
| JP | | A-2002-340158 | 11/2002 | |
| JP | | A-2003-127681 | 5/2003 | |

* cited by examiner

*Primary Examiner*—Ha Ho
(74) *Attorney, Agent, or Firm*—Oliff & Berridge, PLC

(57) ABSTRACT

A drive unit for a vehicle structured so as to be able to attain an interrupting state of inertia of a drive motor under a predetermined condition. Therefore, the drive unit for a vehicle has a drive motor able to transmit driving force to a drive wheel, and an operation lever for selecting a shift range for switching the drive motor between drive and non-drive. Further, the drive unit for a vehicle has a control section having a shift position detector for detecting the shift range selected by the operation lever. The drive unit for a vehicle also has brakes for attaining a neutral state by interrupting the power transmission between the drive motor and the drive wheel when the selection of a parking range is detected by the shift position detector.

12 Claims, 7 Drawing Sheets

|    | B1 | B2 |
|----|----|----|
| Hi | ○  | ×  |
| Lo | ×  | ○  |
| N  | ×  | ×  |

○ ENGAGEMENT
× OPEN

FIG. 4

DRIVE UNIT FOR VEHICLE

This application claims priority from JP 2003-153119 filed May 29, 2003, the disclosure of which is incorporated in its entirety herein by reference thereto.

BACKGROUND OF THE INVENTION

1. Field of Invention

The invention relates to a drive unit of a vehicle, such as an electric automobile (EV) having at least a drive motor, a hybrid car (HEV), etc., and particularly relates to a drive unit improved such that no excessive inertia caused by the existence of the drive motor is applied to a parking device under a predetermined condition when a parking operation is performed.

2. Description of Related Art

A drive unit of a so-called 2-motor split type is conventionally mounted in an automobile (registered trademark Prius) and is practically used as a hybrid drive unit. Although discussed in the context of an automobile, the drive unit can be used with other types of wheeled vehicles. In this hybrid drive unit, an output from an engine is distributed to a motor (generally called a generator) and a running output side by a planetary gear. The output torque of the planetary gear is steplessly controlled by mainly controlling the operation of the motor as the generator. Further, the torque of another motor (generally called a drive motor) is synthesized together with the planetary gear output torque as necessary and is outputted to an output shaft.

The hybrid drive unit of the 2-motor split type in practical use is mounted in the automobile as a drive unit for FF (front engine-front drive; called FF in this specification). However, it is also considered that this hybrid drive unit can be mounted to an automobile of FR (front engine-rear drive; called FR in this specification) type. FIG. 7 schematically shows the hybrid drive unit of such FR type.

As shown in FIG. 7, in the automobile 51 mounting the hybrid drive unit therein, an internal combustion engine 55, such as a gasoline engine, etc. is arranged substantially between front wheels 53, 53 at the front of a vehicle body 52 such that its crank shaft is arranged in the forward-rearward direction. Further, a hybrid drive unit 56 of a type (so-called 2-motor split type) having two motors (conceptually including the generator) is arranged behind and adjacent to the engine 55. The hybrid drive unit 56 is approximately aligned with the crank shaft in the axial direction, and a first motor (generator) 57, a planetary gear 59 for power distribution and a second motor (drive motor) 60 are sequentially arranged from the engine side toward the rear of the automobile 51.

In the hybrid drive unit 56, an input shaft 62 is connected to an output shaft 55a, comprising a backward projecting portion of the engine crank shaft, through a damper device 58. The first motor 57 is coaxially arranged on the outside diameter side of the input shaft 62. The first motor 57 is of an alternating current, permanent magnet synchronous type (AC synchronous motor), and has a stator 63 fixed to a case and a rotor 65 rotatably supported with a predetermined air gap separating the rotor 65 and the inside diameter side of the stator 63.

The planetary gear 59, for power distribution, comprises a simple planetary gear coaxially arranged on the input shaft 62. The planetary gear 59 has a carrier C connected to the input shaft 62 and supporting a plurality of planetary pinions p, a sun gear S connected to the rotor 65, and a ring gear R constituting a running output portion. The ring gear R is connected to an output shaft 66 that extends backwards on the same axial line as the input shaft 62.

The second motor 60 comprises a similar AC synchronous motor, larger in size than the motor 57, and is coaxially arranged on the output shaft 66 at its outside diameter side. The second motor 60 has a stator 67 fixed to the case and a rotor 69 rotatably supported with a predetermined air gap between the rotor 69 and the inside diameter side of the stator 67.

The output shaft 66 projects from the case and extends further rearward and is connected to a differential device 72 through a flexible coupling 70 and a propeller shaft 71 (which are not shown in detail but actually have, for example, a universal joint and a center bearing). Further, the output shaft 66 is connected through the flexible coupling 70, propeller shaft 71, and the differential device 72 to rear drive wheels 75, 75 through left and right drive shafts 73l, 73r.

In the automobile 51, of the FR type mounting this hybrid drive unit 56 thereto, the output of the engine 55 is transmitted to the carrier C of the planetary gear 59 for power distribution through the damper device 58 and the input shaft 62. In the planetary gear 59, the engine output is distributed and transmitted from the sun gear S to the first motor (generator) 57 and is also distributed and transmitted from the ring gear 59 to the output shaft 66 for driving the automobile 51. Here, the output torque and the rotation with respect to the output shaft 66 are steplessly adjusted and outputted by controlling the operation of the first motor 57. When large torque is required at a starting time, etc., the second motor (drive motor) 60 is operated and its motor torque assists the torque of the output shaft 66, is transmitted to the propeller shaft 71 and further transmitted to the rear drive wheels 75, 75 through the differential device 72 and the left and right drive shafts 73l, 73r. In the second motor 60, electricity generated by the first motor 57 is provided as energy. When the generated electric energy is insufficient, the second motor 60 is operated by further using energy from the first motor 57 and/or the second motor 60 stored in a battery. The second motor 60 also functions as a regenerative generator at a brake operating time.

The hybrid drive unit 56 is used for the 2-motor split hybrid, and the system of a type for directly connecting the second motor (drive motor) 60 to the propeller shaft 71 of the running output side is adopted.

SUMMARY OF THE INVENTION

However, there are the problems in such a system. Namely, when the automobile 51 runs at a slight speed, e.g., about 5 km/h, and an operation lever (not shown) is operated and moved to the parking (P) range by the driver, the inertia of the second motor 60 is inputted to the parking parts, such as a parking gear, a parking pole, etc. and a shaft system connected to these parts, as well as the inertia input from the rear drive wheels 75, 75. Therefore, the parking parts and the shafts connected to these parking parts, must have a rigid structure so as to resist the inertia inputs. As its result, these parts are large-sized and heavy in weight in comparison with the same kind of parts for an automatic transmission (A/T) so that there is a concern with increased cost.

Therefore, in view of the above, the invention provides, among many improvements, a drive unit for a vehicle structured so as to attain a state for reliably interrupting the inertia input of the drive motor under a predetermined condition by interposing a means for changing a power transmission state between the drive motor and the drive wheel so that the above problems are solved.

The invention provides a drive unit for a vehicle comprising a drive motor that is able to transmit driving force to a drive wheel and shift range selecting means for selecting a shift range (e.g. D-range, P-range) for switching the drive motor to drive and non-drive, and further comprises a control section having shift position detecting means for detecting the shift range selected by the shift range selecting means; and transmission state switching means for attaining a neutral state by interrupting the power transmission between the drive motor and the drive wheel when the selection of a predetermined range (e.g. P-range) is detected by the shift position detecting means.

BRIEF DESCRIPTION OF THE DRAWINGS

The invention will be explained using the drawings, in which:

FIG. 4 shows an operating mode of the speed change gear corresponding to the operation of the brake;

DETAILED DESCRIPTION OF PREFERRED EMBODIMENTS

Figure 1:
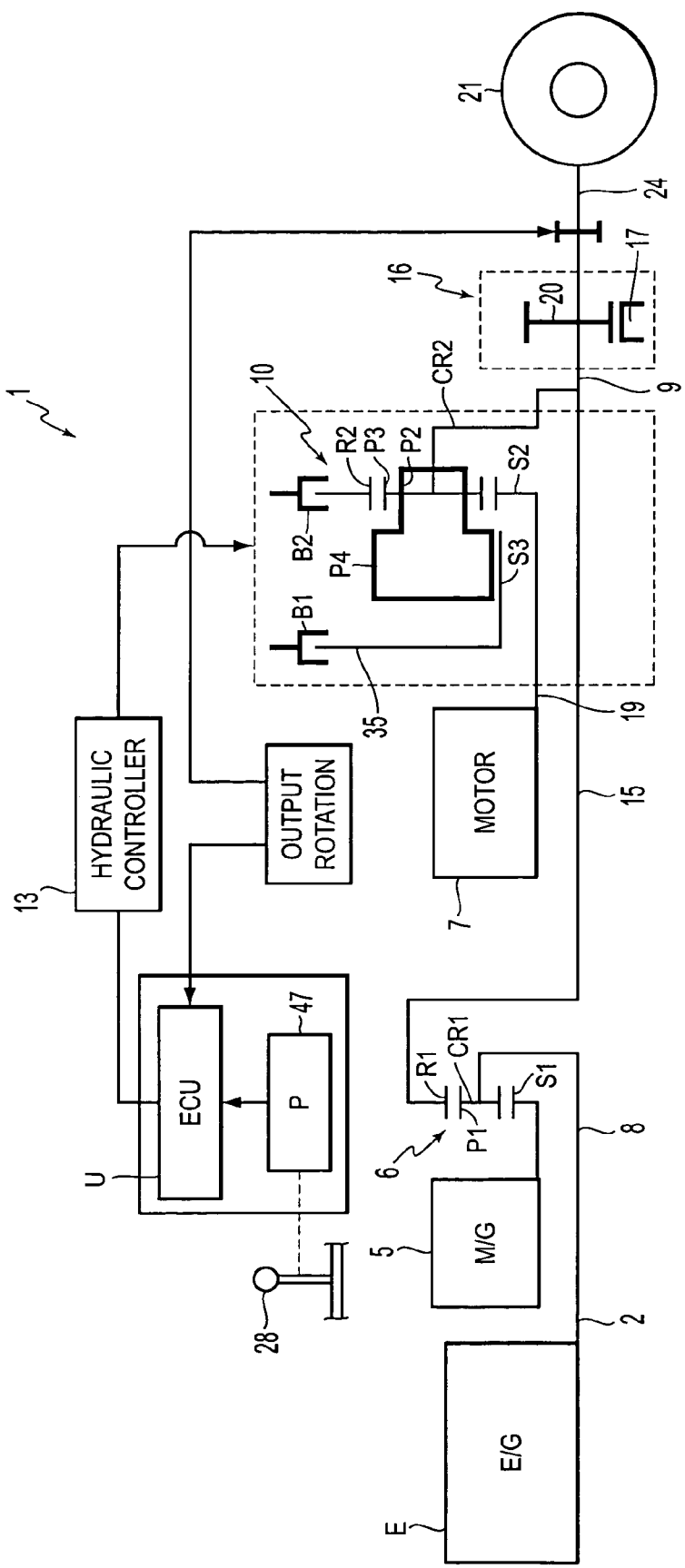
FIG. 1 is a block diagram showing one example of the structure of a drive unit for a vehicle in one form of the invention.

First, the detailed structure of a form of the drive unit of the invention of a vehicle will be explained using FIG. 2. As shown in FIG. 2, the drive unit 1 for a vehicle is structured as a 2-motor split hybrid type. The drive unit 1 has a damper device 3, a first motor (motor-generator) 5, a power distributing planetary gear 6, a second motor (drive motor) 7, and a speed change gear 10 able to change driving force of the second motor 7 and transmit this drive force to an output shaft 9. These members are aligned with a crank shaft 2 from the side of an internal combustion engine E (see FIG. 1) and are sequentially arranged in a uniaxial shape within a case 4.

An input shaft 8 is arranged in the inner circumferential portions of the first motor 5 and the power distributing planetary gear 6 and is aligned with the crank shaft 2 in the uniaxial shape. An intermediate shaft (drive shaft) 15 connected to the input shaft 8 through the power distributing planetary gear 6 and extended toward the side of a drive wheel 21, i.e., toward the output side, (see FIG. 1) is arranged in the inner circumferential portions of the second motor 7 and the speed change gear 10. The intermediate shaft 15 is connected to the output shaft 9 (right side of FIG. 2) and has a rotor shaft 19 rotatably fitted thereto. The output shaft 9 projects from the case 4 and is connected to a differential device (not shown) through a propeller shaft 24 (FIG. 1), a coupling (not shown), etc. The driving force is transmitted from the differential device to the drive wheels 21, 21 (one of the drive wheels is omitted in the figures) through left and right drive shafts (not shown).

Each of the first motor 5 and the second motor 7 comprises an AC synchronous motor. The first motor 5 and the second motor 7 respectively have stators 14, 25 fixed to the case 4, and rotors 18, 22 rotatably supported with predetermined air gaps between each rotor 18, 22 and the inside diameter side of the respective stator 14, 25. Each of the stators 14, 25 has a stator core and a coil wound around the stator core. Further, the second motor 7 has the characteristic of providing an output greater than that of the first motor 5.

A mechanical type oil pump 11, operated by receiving the driving force of the internal combustion engine E (see FIG. 1), is arranged between the power distributing planetary gear 6 and the second motor 7. Further, an electrically operated oil pump 12, operated by receiving electric power from a battery (not shown), is arranged in the lower portion of the case 4 at the outer circumferential portion of the mechanical type oil pump 11. Further, a hydraulic controller 13 is arranged in the case lower portion below the second motor 7 and the speed change gear 10. The hydraulic controller 13 supplies oil supplied from the mechanical type oil pump 11 or the electrically operated oil pump 12 to the first motor 5, the second motor 7, and the speed change gear 10 as oil for cooling and/or lubrication by switching respective built-in valves. The hydraulic controller 13 also supplies oil to hydraulic servos 32, 33 (see FIGS. 3 and 5) for the application and release operations of the brakes B1, B2.

The structure of the power distributing planetary gear 6 will next be explained using FIG. 1 in which the power distributing planetary gear 6 is schematically shown. The power distributing planetary gear 6 has a carrier CR1, a pinion P1 supported by the carrier CR1, a sun gear S1 and a ring gear R1. The carrier CR1 is connected to the input shaft 8, which is uniaxially connected to the crank shaft 2 of the internal combustion engine E mounted to the vehicle, and is operated in association with the crank shaft 2. The sun gear S1 is connected to the rotor 18 (see FIG. 2) so as to be operated in association with the first motor (motor-generator) 5 mounted in the vehicle. The ring gear R1 is connected so as to be operated in association with the intermediate shaft (drive shaft) 15 connected to the drive wheel 21. The power distributing planetary gear 6 controls the output of the engine E and the input of the intermediate shaft 15 by controlling the reaction force applied to the sun gear S1 by the first motor 5.

Figure 2:
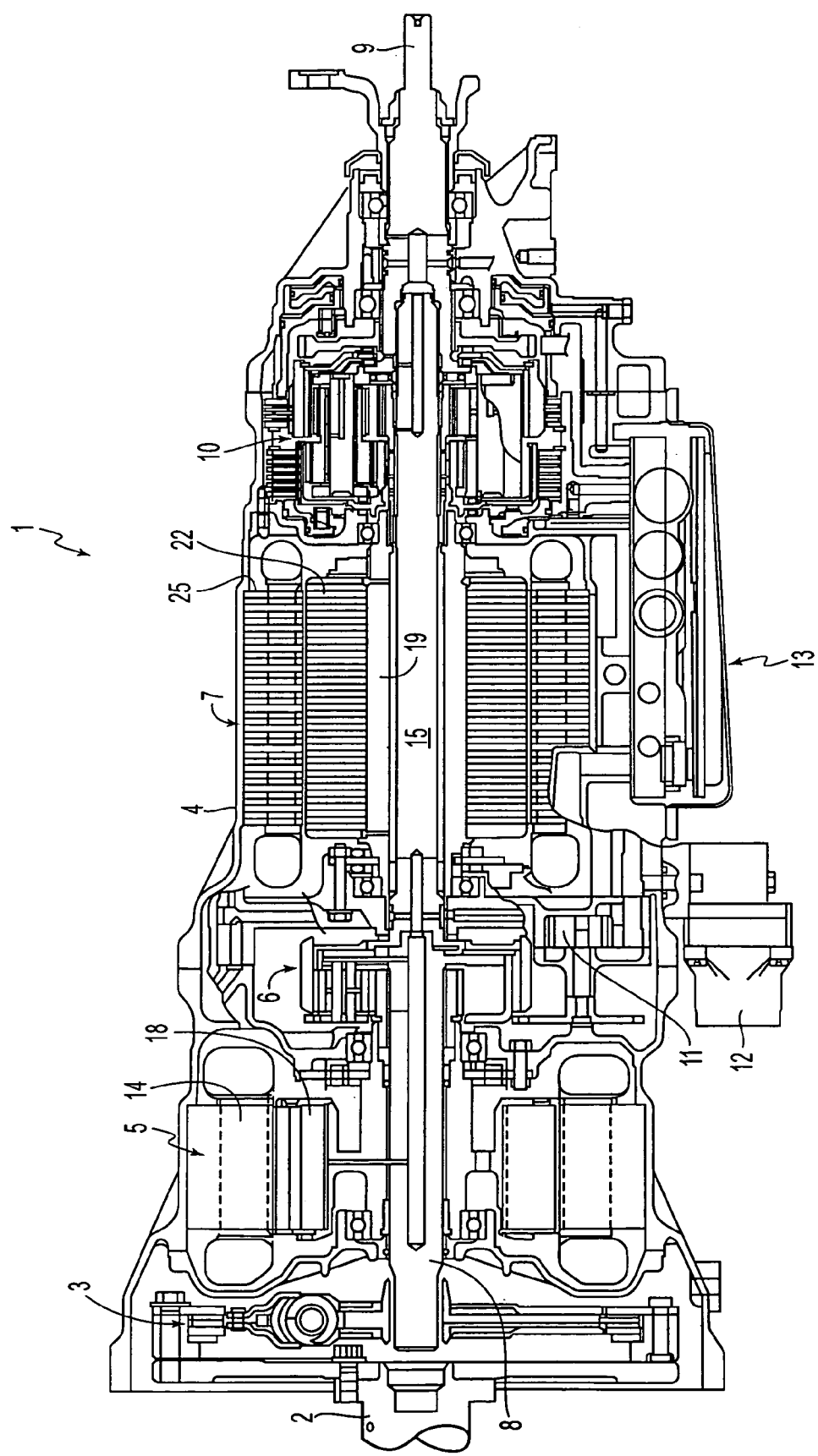
FIG. 2 is a cross-sectional view showing, in cross section, the actual structure of the drive unit for a vehicle corresponding to FIG. 1.

Further, in FIG. 1, a parking device 16 is interposed within a power transmission path from the internal combustion engine E and the second motor 7 to the drive wheel 21. The parking device 16 has a parking gear 20 coaxially connected to the output shaft 9 and also has a parking pole 17 arranged at the outer circumference of the parking gear 20 so as to approach the parking gear 20 and be separated from the parking gear 20. When a parking range (P) is selected by operating an operation lever (shift range selecting means) 28 arranged in a predetermined part of the vehicle, the parking device 16 is operated such that the parking pole 17 is engaged with the parking gear 20 and regulates the rotation of the drive wheel 21 in a neutral state for interrupting the power transmission from the second motor 7 to the output shaft 9 and the propeller shaft 24.

Further, as shown in FIG. 1, a control section (ECU) U, for outputting a control signal to the hydraulic controller 13 which controls the operations of the brakes B1, B2, is provided. A detecting result from a shift position detecting sensor 47, for detecting the shift range (e.g., P-range) selected by the operation lever 28, and a detecting result of the output rotation on the drive wheel 21 side are inputted to the control section U. The control section U will be described later in detail.

Figure 3:
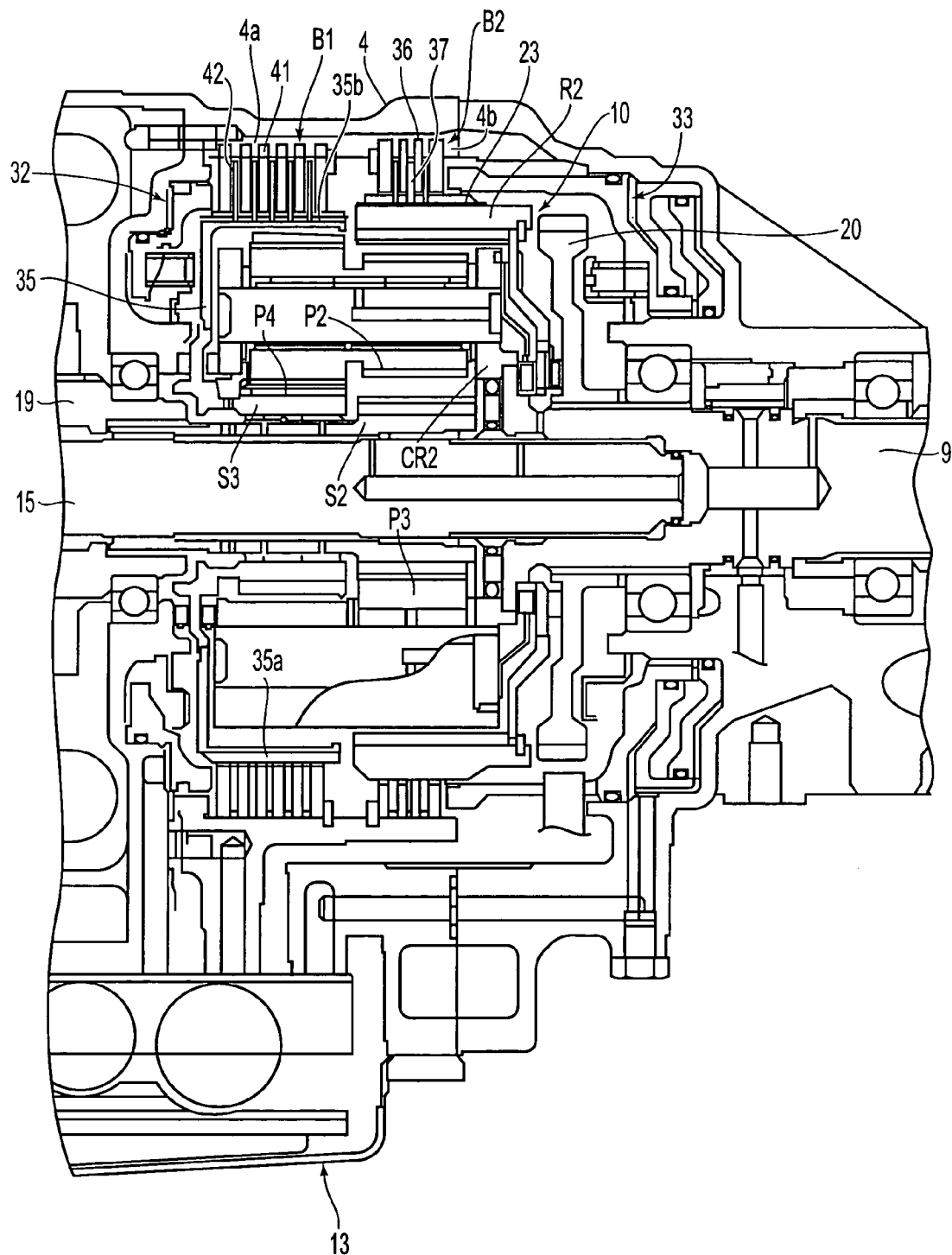
FIG. 3 is a cross-sectional view showing the detailed structure of various components including a speed change gear and a brake.

Next, the structure of the speed change gear 10 will be explained in detail using FIG. 3. The speed change gear 10 is comprised of a first planetary gear unit and a second planetary gear unit. The first planetary gear unit has a sleeve-shaped sun gear S2, a ring gear R2 and small pinions P2, P3. The sun gear S2 is rotatably fitted to the intermediate shaft 15 in a state in which the front end portion (the left-hand end portion in FIG. 3) of the sun gear S2 is spline-connected to the rotor shaft 19 (i.e., a state in which the front end portion is connected to the drive motor 7). The ring gear R2 is rotatably supported, with respect to the intermediate shaft 15, on the outer circumferential side of the sun gear S2. The small pinions P2, P3 are connected to the output shaft 9 and are engaged with both the sun gear S2 and the ring gear R2 and are operated in association with these gears. The small pinion P2 is rotated integrally with a large pinion P4 and is directly engaged with the small pinion P3. Further, the small pinion P3 is directly engaged with the sun gear S2 and the ring gear R2 and the large pinion P4 is directly engaged only with a sun gear S3.

Further, the second planetary gear unit is structured by the large pinion P4 and the sun gear S3. The large pinion P4 is supported by a carrier CR2 in a state in which the large pinion P4 is unaxially connected to the small pinion P2. The sun gear S3 is rotatably fitted to the outer circumference of the sun gear S2 in a state in which the sun gear S3 is engaged with the large pinion P4. The carrier CR2 is supported on the same axis as the intermediate shaft 15 in a state in which plural sets of the pinions P2, P3, P4 are rotatably supported. The large pinion P4 is formed so as to have a diameter larger than that of the small pinion P2 and a tooth number equal to that of the small pinion P2.

The brakes B1, B2 are arranged on the outer circumferential side of the speed change gear 10. A hub member 35 is integrally connected to the sun gear S3 and is extended in the outside diameter direction of the sun gear S3 and has a hub portion 35a extended in parallel with the sun gear S3. Plural frictional plates 42 are engaged with a spline groove 35b formed on the outer circumferential face of the hub portion 35a by regulating rotation with respect to the hub portion 35a. Further, a spline groove 4a is formed in the part opposed to the hub portion 35a within the case 4. Plural frictional plates 41 are engaged with the spline groove 4a so as to regulate the rotation with respect to the case 4 and to be interposed between the respective frictional plates 42. The brake B1 is structured by these plural frictional plates 41, 42 and is unapplied and applied by operating the hydraulic servo 32 arranged adjacent to the brake B1.

On the other hand, plural frictional plates 37 are engaged with a spline groove 23 formed on the outer circumferential face of the ring gear R2 by regulating rotation with respect to the ring gear R2. Further, a spline groove 4b is formed in the part opposed to the ring gear R2 within the case 4. Plural frictional plates 36 are engaged with the spline groove 4b so as to be interposed between the respective frictional plates 37 in a state in which the rotations of the frictional plates 36 with respect to the case 4 are regulated. The brake B2 is structured by these plural frictional plates 36, 37 and is unapplied and applied by operating the hydraulic servo 33 arranged adjacent to the brake B2.

The speed change gear 10 is operated and changed in speed by switching the rotating state of the carrier CR2 by the brakes B1, B2. Namely, the speed change gear 10 is switched to high and low speed stages by allowing or regulating the respective rotations of the ring gear R2 of the first planetary gear unit and the sun gear S3 of the second planetary gear unit on the basis of the respective operations of the brakes B1, B2. Further, the speed change gear 10 attains a neutral state by interrupting the power transmission between the second motor 7 and the drive wheel 21.

Figure 4:
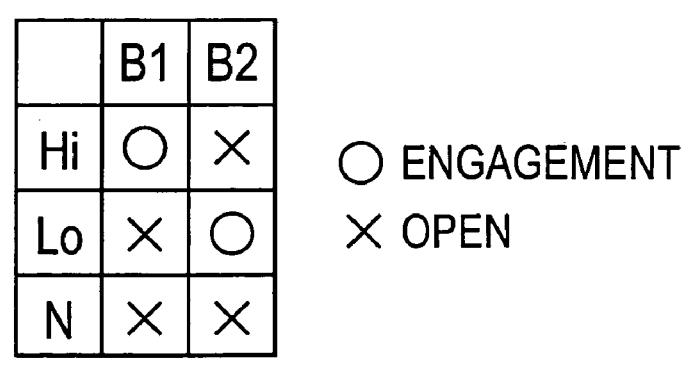

Here, the operating mode of the speed change gear 10 based on each of the operations of the brakes B1, B2 will be explained using FIG. 4. In this figure, O shows an engaging state and X shows a non-engaging (opening) state.

Namely, in a state in which the brake B1 is engaged and the brake B2 is opened (released), the rotation of the sun gear S3 is regulated by the brake B1 and the rotation of the ring gear R2 is allowed so that the speed change gear 10 is switched to the high speed stage (Hi). Further, in a state in which the brake B1 is opened and the brake B2 is engaged, the rotation of the ring gear R2 is regulated by the brake B2 and the rotation of the sun gear S3 is allowed so that the speed change gear 10 is switched to the low speed stage (Lo). Further, in a state in which both the brakes B1, B2 are opened, the speed change gear 10 attains a neutral state (N) in which the rotations of both the sun gear S3 and the ring gear R2 are allowed and no rotation of the sun gear S2 is transmitted to the output shaft 9 and the propeller shaft 24.

Figure 5:
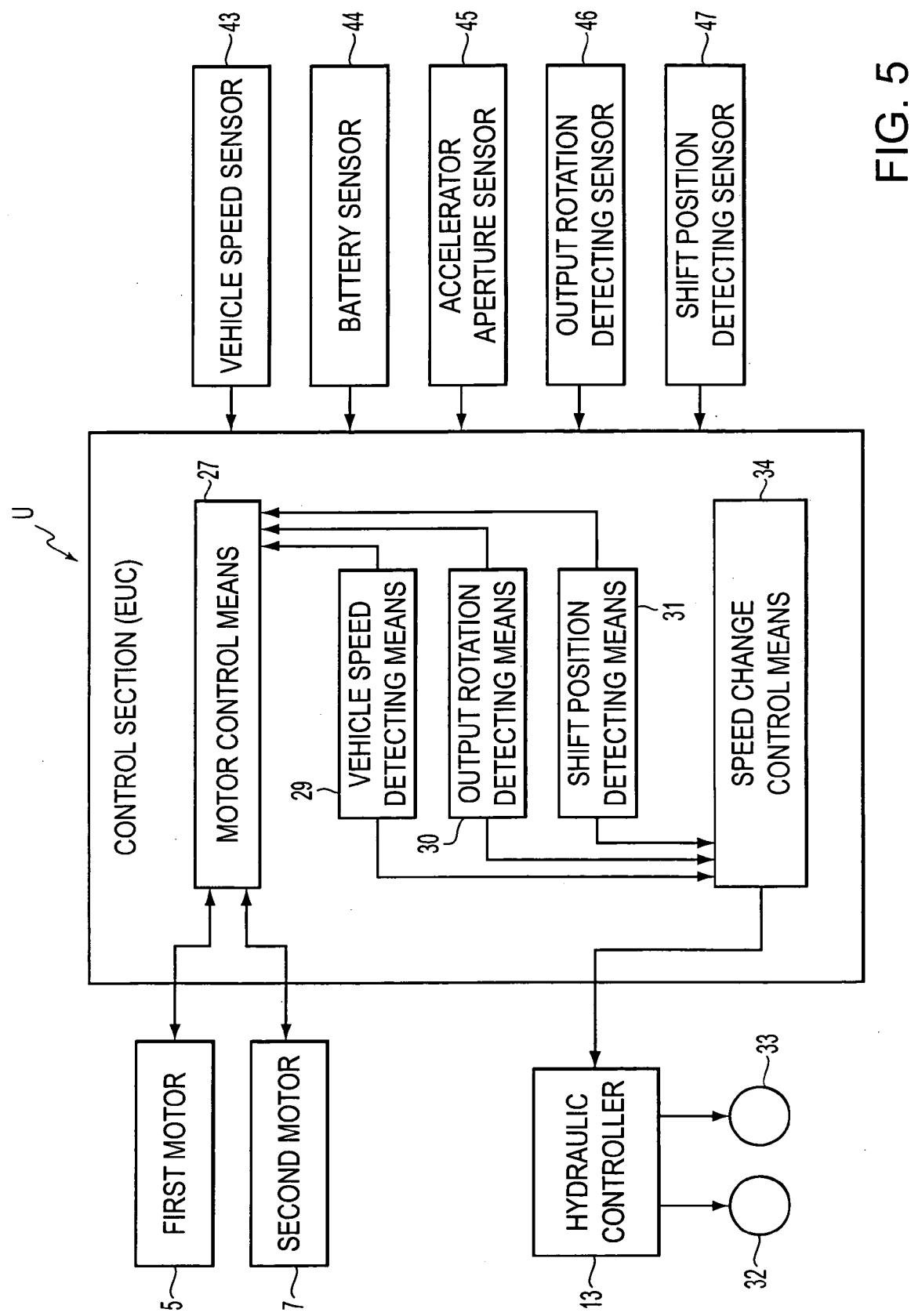
FIG. 5 is a block diagram showing a control system in the form of the invention.

The structure of a control system for controlling the operation of this drive unit 1 for a vehicle will next be explained using FIG. 5. Namely, as shown in this figure, the control system has the control section U. The control section U has a motor control means 27, a vehicle speed detecting means 29, an output rotation detecting means 30, a shift position detecting means 31, and a speed change control means 34. A vehicle speed sensor 43, a battery sensor 44, an accelerator aperture sensor 45, an output rotation detecting sensor 46, and the shift position detecting sensor 47 are connected to the input side of the control section U. The first motor 5, the second motor 7 and the hydraulic controller 13 are connected to the output side of the control section U. Further, the hydraulic servo 32 for operating the brake B1 and the hydraulic servo 33 for operating the brake B2 are connected to the hydraulic controller 13.

The motor control means 27 respectively controls the operations of the first motor 5 and the second motor 7 at a suitable time on the basis of the detecting results of a charging amount (SOC) of the battery (not shown) using the battery sensor 44, the detecting result of an intention of a driver using the accelerator aperture sensor 45 together with vehicle speed information, output rotation information and shift position information of the shift lever 28 respectively sent from the vehicle speed detecting means 29, the output rotation detecting means 30, and the shift position detecting means 31.

The vehicle speed detecting means 29 detects the running speed of the vehicle mounting the drive unit 1 for a vehicle thereto on the basis of the detecting result of the vehicle speed sensor 43. Further, the output rotation detecting means 30 detects an output rotation number on the basis of the detecting result of the output rotation detecting sensor 46. Further, the shift position detecting means 31 detects the selecting situation of a shift range, i.e., which of the parking (P) range, the reverse (R) range, the neutral (N) range and the drive (D) range the operation lever 28 is placed in on the basis of the detecting result of the shift position detecting sensor 47.

The speed change control means 34 sends a control signal to each of valves of the hydraulic controller 13 and operates the valves at a suitable time on the basis of the detecting result of the intention of the driver using the accelerator aperture sensor 45, etc. together with the vehicle speed information, the output rotation information, and the shift position information respectively sent from the vehicle speed detecting means 29, the output rotation detecting means 30 and the shift position detecting means 31. The speed change control means 34 then executes control in which the speed change gear 10 is switched to the high and low speed stages.

Subsequently, the operation of the drive unit 1, for a vehicle, having the above structure will be explained. The output of the internal combustion engine E is transmitted to the power distributing planetary gear 6 through the crank shaft 2 and the input shaft 8 and is distributed to the first motor 5 and the intermediate shaft 15 by the planetary gear 6. Further, the output rotation from the intermediate shaft 15 is steplessly adjusted by controlling the operation of the first motor 5. Namely, the output of the internal combustion engine E and the input of the intermediate shaft 15 are controlled by controlling a reaction force applied to the sun gear S1 in the power distributing planetary gear 6 by the motor-generator 5.

The rotation of the output shaft 9 is transmitted to the drive wheels 21, 21 through the propeller shaft 24, the differential device (not shown) and the left and right drive shafts (not shown) by rotating the output shaft 9 together with the intermediate shaft 15. Thus, the drive wheels 21, 21 are rotated and operated. In this case, the second motor 7 is operated as needed, and the speed change gear 10 changes speeds by performing the unapplying and applying operations of the brakes B1, B2. Thus, the output of a low or high speed stage, taken out of the carrier CR2 of the speed change gear 10, is transmitted to the drive wheels 21, 21 through the output shaft 9, the propeller shaft 24, etc. and assists the driving force from the internal combustion engine E.

At the running time, the speed change control means 34 transmits a control signal to the hydraulic controller 13 on the basis of the inputted vehicle speed information, output rotation information, shift position information of the operation lever 28, accelerator aperture information, etc. Thus, for example, when the hydraulic servo 32 is operated in the opening state of the brake B2 and the brake B1 is engaged, the sun gear S3 is engaged through the hub member 35 and the large pinion P4 is rotated with respect to the sun gear S3 while the large pinion P4 is engaged with the sun gear S3. Thus, the rotation of the high speed stage is obtained through the carrier CR2. Further, for example, when the hydraulic servo 33 is operated in the opening state of the brake B1 and the brake B2 is engaged, the ring gear R2 is engaged and the small pinion P3 is rotated with respect to the sun gear S2 while the small pinion P3 is engaged with the sun gear S2. Thus, the rotation of the low speed stage is obtained through the carrier CR2.

On the other hand, for example, when the operation lever 28 is switched to the parking range in a state in which a driver performs a decelerating operation, such as stepping on the foot brake (not shown) to stop the vehicle at the running time and the vehicle is running at a slight speed of about 5 km/h, the parking pole 17 of the parking device 16 is engaged with the parking gear 20 in accordance with the lever operation. However, in this case, the shift position detecting means 31 detects the switching to the P-range of the operation lever 28, and the speed change control means 34 outputs a brake operating signal to the hydraulic controller 13 on the basis of the detecting result of the shift position detecting means 31. Accordingly, the hydraulic controller 13 stops hydraulic supply into the receiving side of the hydraulic supply to the hydraulic servos 32, 33. Thus, because both the brakes B1, B2 simultaneously attain the non-engaging state, both the sun gear S3 and the ring gear R2 are opened and a neutral state for outputting no rotation of the sun gear S2 from the carrier CR2 is attained.

Accordingly, even when the parking device 16 is operated in the slight speed running state, at least a state for applying no inertia from the second motor 7 is obtained when the parking pole 17 is engaged with the parking gear 20. Therefore, it is possible to use a compact member having relatively low strength in consideration of only the inertia from the drive wheel 21 side in parking parts, such as the parking pole 17 and the propeller shaft 24, etc. Thus, it is possible to expect that the device structure is made compact and light in weight and the cost is also reduced.

Further, in accordance with the invention, a very simple structure can be realized as a transmission state switching means that comprises the brakes (frictional engaging means) B1, B2 for switching transmission paths of the speed change gear 10. Further, the speed change gear 10 comprises the planetary gear unit, and the transmission state switching means is provided by the brakes B1, B2 for engaging the sun gear S3 and the ring gear R2 of the planetary gear unit. Accordingly, the respective rotations of the sun gear S3 and the ring gear R2 are allowed or regulated by merely switching the engaging states of the brakes B1, B2 at a suitable time. Thus, the rotation of the second motor 7 is changed to the high and low speed stages. Further, the drive unit 1 for a vehicle realizes a simple structure able to easily form a state in which no inertia of the second motor 7 is transmitted onto the power transmission downstream side as the neutral state is attached by interrupting the rotation.

Further, in accordance with the form of the invention, the output of the internal combustion engine E and the input of the intermediate shaft 15 are preferably controlled by controlling the reaction force of the sun gear S1 in the power distributing planetary gear 6 by the first motor 5 so that the control accuracy of torque can be improved. Further, the output of the second motor 7 is assisted in the engine output transmitted via the power distributing planetary gear 6 by combining the brakes B1, B2 with the control of the output of the internal combustion engine E and the input of the intermediate shaft 15. Otherwise, a state for interrupting the torque transmission of both the internal combustion engine E and the second motor 7 onto the drive wheel 21 side is obtained in each of the operations of the power distributing planetary gear 6 and the brakes B1, B2.

In this form of the invention, the interrupting state of the driving force of the second motor 7 can be attained during the running as mentioned above. Accordingly, for example, it is also possible to expect effects in which an ABS (Anti lock Brake System) control is easily executed, etc.

Figure 6:
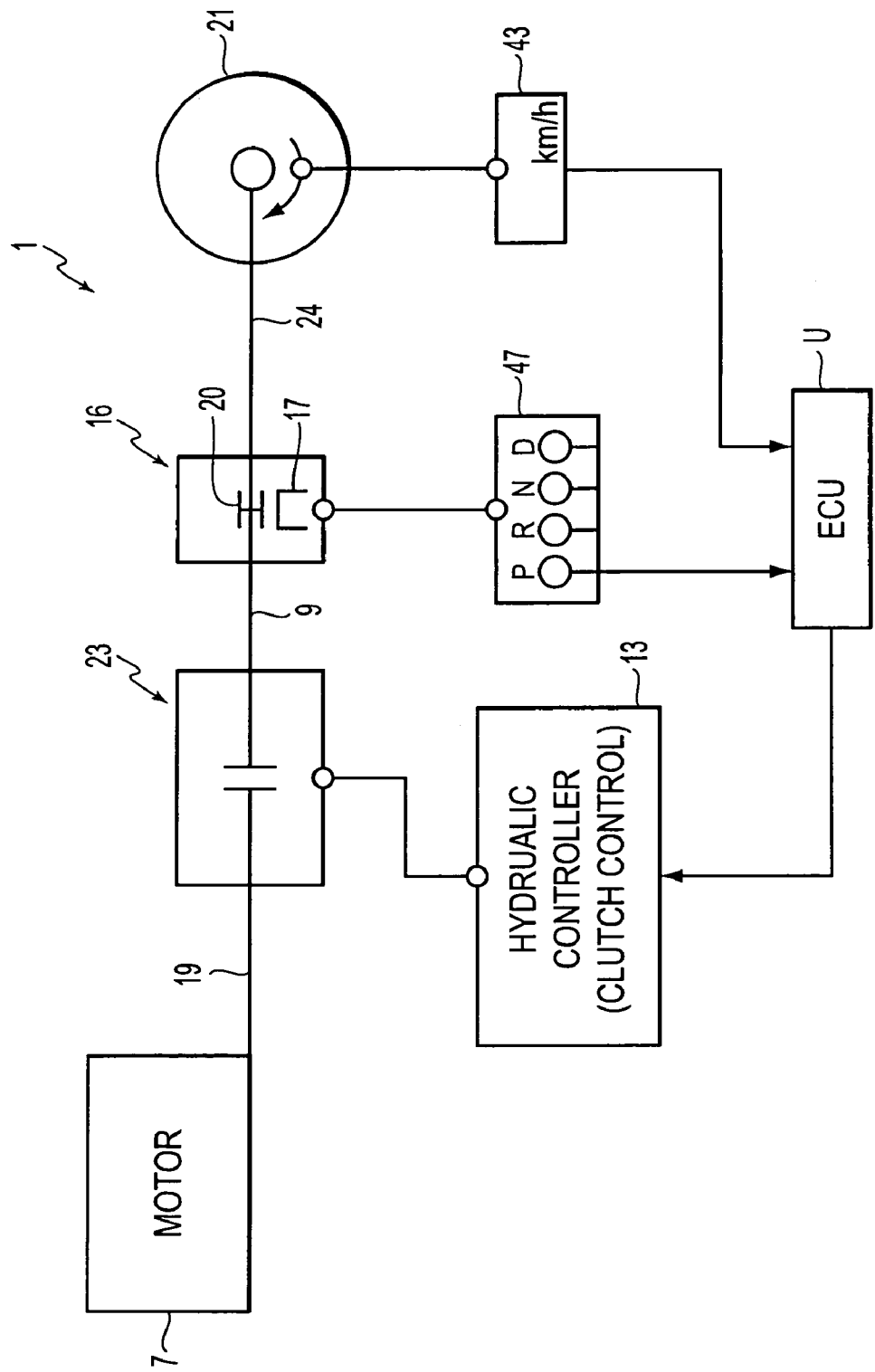
FIG. 6 is a block diagram showing an example of the structure of a drive unit for a vehicle in another form of the invention.
Figure 7:
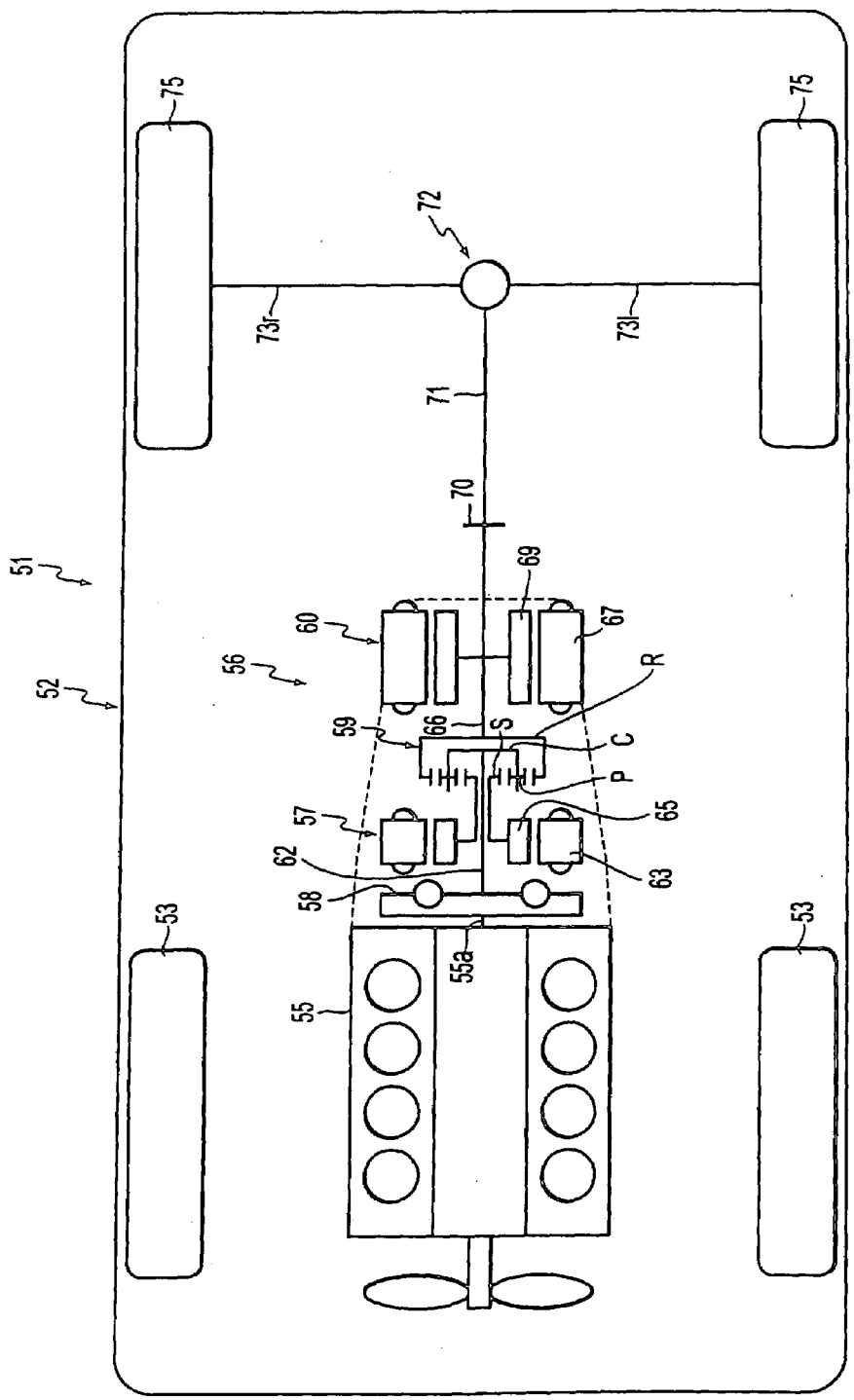
FIG. 7 is a block diagram showing a structural example of a conventional hybrid drive unit.

FIG. 6 shows a partially changed form of the invention. This form of the invention is an example in which a drive unit 1' for a vehicle is mounted to an electric automobile (EV). In this drive unit 1' for a vehicle, the internal combustion engine E, the first motor 5, and the power distributing planetary gear 6 shown in FIG. 1 of the previous form are not provided, but only the second motor 7 is provided as a driving source. In this second form, portions similar to those in the previous form are designated by the same reference numerals and their explanations are omitted.

In this second form, only a clutch (frictional engaging means) 23, disconnected and connected by the control of the hydraulic controller 13, is arranged as a transmission state switching means for interrupting the power transmission between the second motor 7 and the drive wheel 21. Namely, this form has only the clutch 23, such as a multiple disc clutch, which is frictionally engaged when a hydraulic servo (not shown) is operated by the hydraulic pressure supplied from the hydraulic controller 13. In this form, no speed change stage is switched by switching the engaging states of the brakes B1, B2 as in the previous form of the invention, but the speed change is made by changing the rotating speed of the second motor 7. Therefore, a transmission state switching means of a very simple structure is realized.

In this form, having the above structure, it is also possible to attain a state in which the power transmission between the second motor 7 and the drive wheel 21 is interrupted by setting the clutch 23 to the non-engaging state with the switch to the parking range during the slight speed running. As a result, no inertia of the second motor 7 is received when the parking pole 17 is engaged with the parking gear 20. Thus, comparatively compact members are adopted in the parking parts, the propeller shaft 24, etc. so that the drive unit 1' for a vehicle can be compactly structured.

In summary, in the invention, the motor is not limited to a so-called motor, in a narrow sense, for converting electric energy into a rotating movement, but is a concept also including a so-called generator for converting the rotating movement into electrical energy.

In the invention, the neutral state for interrupting the power transmission between the drive motor and the drive wheel is obtained when the predetermined range is selected. Accordingly, for example, when the parking device operated in association with the selection of the predetermined range is interposed between the drive motor and the drive wheel, a state for applying no inertia from the drive motor to the shaft of the running output side and the parking device and applying only the inertia of the drive wheel side to the shaft of the running output side and the parking device is obtained even when the parking device is operated during slight speed running. Therefore, it is not necessary to further raise the strength of parts used in the parking device and in the shafts connected to these parts. Accordingly, it is possible to restrain the size and weight of the parts.

Also, in the invention, the state for applying no inertia of the drive motor to the parking device can be attained by the transmission state switching means even when the parking device is operated in the slight speed running state. Accordingly, the parking device can be set to a compact structure using comparatively simple parts able to receive only the inertia of the drive wheel side.

Further, in the invention, the transmission state switching means is structured by the frictional engaging means for switching the transmission path of the speed change gear. Accordingly, it is possible to realize the transmission state switching means of a very simple structure.

Additionally, in the invention, the speed change gear is the planetary gear unit and the transmission state switching means is structured by plural brakes for engaging a predetermined rotating element of the planetary gear unit. Accordingly, the rotation of the drive motor is changed in speed and is transmitted to the drive wheel merely by switching the engaging state of the brake at a suitable time. Otherwise, the neutral state is attained by interrupting the rotation. Thus, it is possible to realize the transmission state switching means using a simple structure able to easily form a state for transmitting no inertia of the drive motor onto the power transmission downstream side.

Also, in the invention, the predetermined rotating element is provided by the ring gear of the first planetary gear unit and the sun gear of the second planetary gear unit. Accordingly, high and low speed stages can be reliably obtained by allowing or regulating the respective rotations of the ring gear and the sun gear merely by switching the brake operation at a suitable time. Further, the neutral state can be easily attained.

And, in the invention, the output of the engine and the input of the drive shaft are preferably controlled by controlling the reaction force applied to the second rotating element by the motor-generator so that the control accuracy of the torque, etc. can be improved. Further, the drive motor output is assisted in the engine output transmitted via the above planetary gear by combining the transmission state switching means. Otherwise, it is also possible to interrupt the torque transmission of both the engine and the drive motor onto the drive wheel side by operating each of the planetary gear and the transmission state switching means.

What is claimed is:

1. A drive unit for a vehicle comprising a drive motor capable of transmitting a driving force to a drive wheel and shift range selecting means for selecting a shift range for switching the drive motor to drive and non-drive, and further comprising:

a control section having shift position detecting means for detecting the shift range selected by the shift range selecting means;

transmission state switching means for attaining a neutral state by interrupting power transmission between the drive motor and the drive wheel when the selection of a predetermined range is detected by the shift position detecting means; and a parking device interposed within a power transmission path from the drive motor to the drive wheel, wherein the parking device regulates the rotation of the drive wheel in the neutral state when the predetermined range as a parking range is selected by the shift range selecting means.

2. The drive unit for a vehicle according to claim 1, wherein a speed change gear for changing the rotating speed of an output section of the drive motor to plural stages and transmitting the rotation to the drive wheel is arranged between the output section and the drive wheel, and the transmission state switching means is frictional engaging means for switching the transmission path of the speed change gear.

3. The drive unit for a vehicle according to claim 2, wherein the speed change gear is a planetary gear unit, and the transmission state switching means is plural brakes for engaging a predetermined rotating element of the planetary gear unit.

4. The drive unit for a vehicle according to claim 3, wherein the planetary gear unit is structured by a first planetary gear unit structured by a sun gear, a ring gear and a small pinion engaged with both the sun gear and the ring gear and supported by a carrier, and a second planetary gear unit structured by a large pinion supported by the carrier, and a sun gear engaged with the large pinion and rotatably fitted to the outer circumference of the sun gear of the first planetary gear unit, and the predetermined rotating element is structured by the ring gear of the first planetary gear unit and the sun gear of the second planetary gear unit.

5. The drive unit for a vehicle according to claim 4, wherein the drive unit for a vehicle has a planetary gear which is structured by a first rotating element operated in association with the output shaft of an engine mounted to the vehicle, a second rotating element operated in association with a motor-generator mounted to the vehicle, and a third rotating element operated in association with a drive shaft connected to the drive wheel, and can control the output of the engine and the input of the drive shaft by controlling a reaction force applied to the second rotating element by the motor-generator.

6. The drive unit for a vehicle according to claim 2, wherein the drive unit for a vehicle has a planetary gear which is structured by a first rotating element operated in association with the output shaft of an engine mounted to the vehicle, a second rotating element operated in association with a motor-generator mounted to the vehicle, and a third rotating element operated in association with a drive shaft connected to the drive wheel, and can control the output of the engine and the input of the drive shaft by controlling a reaction force applied to the second rotating element by the motor-generator.

7. The drive unit for a vehicle according to claim 1, wherein the drive unit for a vehicle has a planetary gear which is structured by a first rotating element operated in association with the output shaft of an engine mounted to the vehicle, a second rotating element operated in association with a motor-generator mounted to the vehicle, and a third rotating element operated in association with a drive shaft connected to the drive wheel, and can control the output of the engine and the input of the drive shaft by controlling a reaction force applied to the second rotating element by the motor-generator.

8. The drive unit for a vehicle according to claim 2, wherein the drive unit for a vehicle further comprises:
   an output shaft arranged in a power transmission path from the speed change gear to the drive wheel, and
   the parking unit is arranged on the output shaft.

9. The drive unit for a vehicle according to claim 8, wherein the parking device has a parking gear coaxially connected to the output shaft and a parking pole arranged in the outer circumference of the parking gear so as to approach the parking gear and be separated from the parking gear.

10. The drive unit for a vehicle according to claim 9, wherein the parking device is operated such that the parking pole is engaged with the parking gear and regulates the rotation of the drive wheel when a parking range is selected by operating the shift range selecting means.

11. A drive unit for a vehicle comprising a drive motor capable of transmitting a driving force to a drive wheel and a shift range selecting device that selects a shift range for switching the drive motor to drive and non-drive, and further comprising:
   a control section having a shift position detecting device that detects the shift range selected by the shift range selecting device;
   a transmission state switching element that attains a neutral state by interrupting the power transmission between the drive motor and the drive wheel when the selection of a predetermined range is detected by the shift position detecting device; and
   a parking device interposed within a power transmission path from the drive motor to the drive wheel, wherein the parking device regulates the rotation of the drive wheel in the neutral state when the predetermined range as a parking range is selected by the shift range selecting means.

12. A method for driving a vehicle having a drive motor capable of transmitting a driving force to a drive wheel and a parking device interposed within a power transmission path from the drive motor to the drive wheel, comprising:
   selecting a shift range for switching the drive motor to drive and non-drive;
   detecting the shift range selected;
   interrupting power transmission between the drive motor and the drive wheel when the selection of a predetermined range is detected to attain a neutral state; and
   regulating the rotation of the drive wheel in the neutral state when the predetermined range as a parking range is selected.

* * * * *